United States Patent Office 3,489,546
Patented Jan. 13, 1970

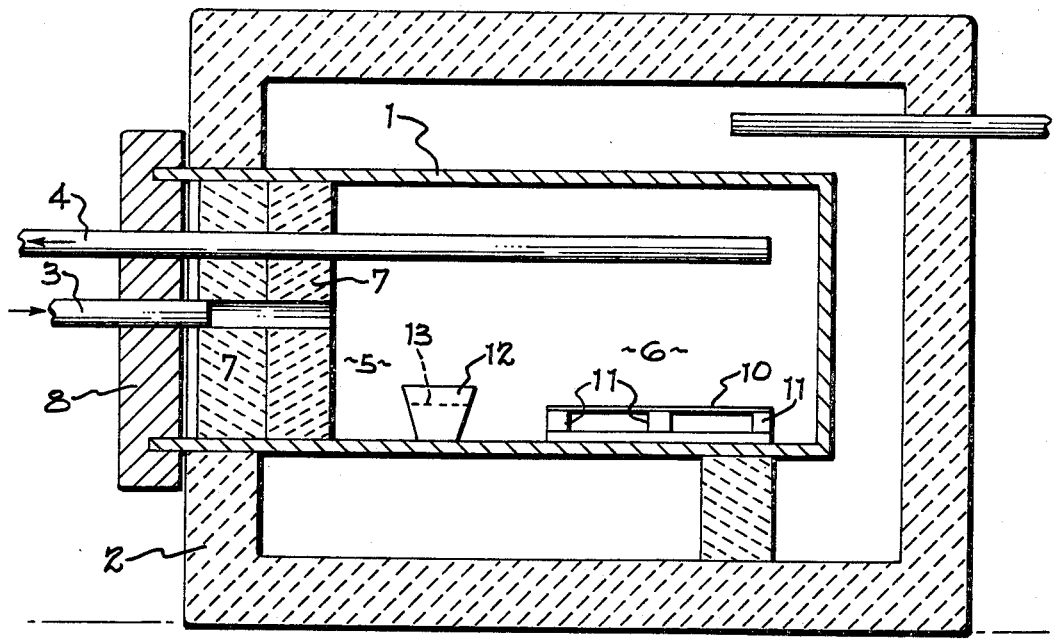

3,489,546
STRENGTHENING OF OXIDIZED SODA-LIME
GLASS ARTICLES
Francis J. Shonebarger, Lancaster, Ohio, assignor to
Anchor Hocking Glass Corporation, Lancaster,
Ohio, a corporation of Delaware
Continuation-in-part of application Ser. No. 540,080,
Apr. 4, 1966. This application Oct. 17, 1966, Ser.
No. 613,366
Int. Cl. C03c 17/22
U.S. Cl. 65—30                                    12 Claims

ABSTRACT OF THE DISCLOSURE

A method of increasing the strength of oxidized soda-lime glass articles, without the development of coloration. The article is heated under non-reducing conditions to a temperature above the annealing point of the glass but below the temperature at which the article deforms, while exposing it to a cuprous halogen in the vaporous form. The heating is continued for a period sufficient to enrich a surface layer of said article with copper ions from the cuprous halogen. Then, the article is cooled below the annealing point in a non-reducing atmosphere.

---

This invention relates to a method of treating glass to increase its mechanical strength, and to glass which has been strengthened by the new method.

This application is a continuation-in-part of my co-pending application Ser. No. 540,080, filed Apr. 4, 1966, now abandoned.

More particularly, the invention relates to the treatment of glass articles with cuprous chloride, CuCl, sometimes also expressed as $Cu_2Cl_2$, and other cuprous halogens. The strengthening is effected by providing the glass article with a thin, copper ion-enriched surface layer which is under compression at room temperature.

The tensile strength of perfect glass is very high, if, but only if, the surface of the glass is completely unabraded. The slightest scratch reduces the tensile strength to a fraction of the unabraded strength, and as a practical matter it may be said that completely unabraded glass articles do not generally exist outside of the laboratory. Inevitably, a glass article is sufficiently scratched by the ordinary handling icidental to manufacture, packaging and use that for all practical purposes it must be considered as abraded and, hence, as having a tensile strength of low order in comparison with unabraded glass of similar composition.

It is known that glass can both be strengthened and made more resistant to the effects of abrasion by imparting a compressional surface stress to it. Such strengthening has heretofore been accomplished by tempering, that is, by heating the glass article and then suddenly cooling it. However, the increase in strength obtained by the tempering method is usually not permanent, and may be lost if in use the article is heated too long at an elevated temperature below its annealing point. Moreover, the maximum tensile strength which can be obtained in many types of glass articles by tempering is relatively low in comparison to the strengths which can be achieved by the present invention.

Another method of strengthening glass, described in Hood et al. Patent No. 2,779,136, is carried out by contacting glass articles of certain compositions with a molten lithium salt. Inasmuch as that method requires immersing the article into a liquid treating bath at high temperature, it is relatively cumbersome in comparison to the present process, which provides a vapor phase treatment.

I have now discovered a novel method of encasing a glass article with a compressional surface layer whereby these shortcomings of prior art methods are obviated, and by which glass articles can be produced having tensile strengths of as much as four times those of the untreated article. Moreover, the present method is applicable to glass articles formed by blowing, pressing, drawing, rolling and a wide variety of other known methods.

This invention is based on the empirical discovery and determination that a copper ion-rich surface layer, produced by the displacement of certain metal ions in the surface of a glass article by copper ions and having a thickness greater than the normal and usual abrasive cutting to which the glass surface is ordinarily subjected in use, can by a certain treatment of the article be made to behave as if it has a coefficient of thermal expansion which is less than that of the interior portion of the glass article into which the copper ions have not penetrated. I have found that if the glass article is given a certain treatment, contemporaneously with or after the surface impregnation with copper, a compressive surface layer results which doubles, trebles or even quadruples the abraded tensile strength of the article. In addition, this copper ion-rich surface layer or zone makes the glass more resistant to thermal shock and more resistant to chemical attack by leaching of alkali from the glass.

The mere provision of a copper ion-rich layer at the surface of the glass does not in and of itself accomplish my purpose nor provide the improved results. The glass with the copper ion-rich surface layer must be subjected to a treatment which, without reducing the copper ions to metallic copper, is believed to relieve strain within the glass at an elevated treating temperature so that subsequent cooling to room temperature places the copper ion-rich surface layer under compression. This compression results from the fact that the modified surface layer of the article apparently has a lower coefficient of expansion than the interior of the article between the peak treating temperature and room temperature; hence the interior of the article can be envisioned as tending to shrink more on cooling than the copper ion-rich surface layer thereby placing the surface layer in compression.

Inasmuch as the radius of the monovalent copper ion $Cu^+$ is 0.96 angstrom units and that of monovalent sodium ions is 0.95 angstrom units, it is difficult to account for the change in expansion of the modified surface layer on the basis of copper replacement of sodium. Where the substituted ions are about the same size as those replaced, it would not be predicted that a significant change in the glass structure would occur.

Broadly stated, the method according to this invention comprises forming a glass article containing replaceable alkali metal ions, and heating the article in the presence of a cuprous halogen, i.e., cuprous chloride, bromide, iodide or fluoride, under conditions at which the cuprous ions are not reduced to the metal, to cause copper ions to migrate from the surface into a zone underlying the surface in partial exchange for the alkali metal ions of the glass. The heating cycle should attain a peak temperature which is above the annealing point but not so high as to cause undesirable deformation of the article. The heating is carried out for a period sufficient that the copper ion-rich layer will be placed in compression when the article is subsequently cooled.

The term "annealing point", as defined by the American Society for Testing Materials, is that temperature at which a given glass has a viscosity of $10^{13}$ poises. The annealing point can be determined by the method of ASTM C336–54T, as described in ASTM Standards on Glass and Glass Products, "Methods of Testing Specifications," 5th ed., December 1962.

The method of this invention is broadly applicable to the treatment of glass compositions which include 7 to 25% of the alkali metal oxide $Na_2O$, and 45 to 80% by weight $SiO_2$. I prefer to use glasses which include about 57 to 74% by weight $SiO_2$, 9 to 17% $Na_2O$, 4.5 to 12% total ($CaO+MgO$), and up to 12% $Al_2O_3$. Included in this are the soda-lime glasses of commerce, which comprise by far the largest group of all glasses in terms of annual production, and of which window glass, glass containers and the like are ordinarily made, comprising approximately 65 to 74% $SiO_2$, 14 to 17% $Na_2O$, 7 to 12% ($MgO+CaO$), and up to 3% $Al_2O_3$.

This method differs from the staining of glass with a copper compound to produce a ruby color, in which the ruby is "struck" by subjecting the article to a reducing step at relatively low temperatures, whereby the red color is developed. The products of this invention are not reduced and do not display any red or ruby coloration. Ordinarily the present products display essentially the same color or clearness after the copper treatment as they displayed before it; for example, if the starting glass composition is green in color, that color is essentially the same before and after the treatment, at least when the article is viewed in the direction perpendicular to the treated surface. At very high copper concentrations a slight bluish cast can sometimes be seen. Moreover, these products display a remarkably higher strength by reason of the surface compression layer imparted to them.

As described more fully hereinafter, the method of this invention may be carried out by contacting the glass article with the cuprous halogen, which may be in the solid, liquid, or vapor state; however, because of the simplicity and efficacy of the vapor treatment, that constitutes the preferred method of treatment. Cuprous chloride is a solid at room temperature, vaporizes at useful rates above approximately 750° F. at atmospheric pressure, and melts at 792° F. The relative vapor pressures of cuprous chloride, cuprous bromide (CuBr) and iodide (CuI) are given in the following table:

|  | CuCl | CuBr | CuI |
| --- | --- | --- | --- |
| Temp. at which vapor pressure is 1 mm. Hg, ° F. | 1,015 | 1,062 | Solid |
| Temp. at which vapor pressure is 10 mm. Hg, ° F. | 1,296 | 1,324 | 1,213 |

When an alkali metal-containing glass is heated to about 800° F. or higher in the presence of a cuprous halogen, copper ions migrate from the surface of the glass into the interior displacing alkali metal ions therein. The displacement of sodium ions, for example, by this process, can readily be detected by the formation of a film of the corresponding sodium halogen on the surface of the articles. The presence of copper in the glass surface has been confirmed by X-ray fluorescence analysis.

The practice of the invention can best be further described in relation to the following examples and the accompanying drawing, in which:

FIGURE 1 is a flow sheet illustrating a preferred method of practicing the invention by cuprous chloride treatment of articles of soda-lime glass on a batch basis; and FIGURE 2 is a vertical section of apparatus in which the method of this invention may be carried out on a batch basis.

The following glass compositions, in parts by weight as analysed, are illustrative of various types of glasses which can be used in carrying out the new method:

| Oxide | Composition | | | | |
| --- | --- | --- | --- | --- | --- |
|  | 1 | 2 | 3 | 4 | 5 |
| $SiO_2$ | 72.79 | 67.94 | 70.85 | 59.82 | 70.3 |
| $Na_2O$ | 14.74 | 15.82 | 15.05 | 9.38 | 16.0 |
| $K_2O$ | 0.26 | 0.48 | 0.20 | 1.87 | 0.2 |
| $Al_2O_3$ | 1.24 | 2.85 | 1.82 | 10.14 | 1.0 |
| $B_2O_5$ |  | 1.69 |  | 1.10 |  |
| $Fe_2O_3$ | 0.026 | 0.035 | 0.040 | 0.048 | 0.1 |
| BaO |  | 0.24 | 2.05 | 0.41 |  | 0.5 |
| CaO | 6.23 | 5.53 | 6.96 | 4.85 | 9.2 |
| MgO | 3.88 | 3.75 | 4.18 | 0.04 | 2.5 |
| ZnO |  |  |  | 8.82 |  |
| $Li_2O$ |  | Trace |  |  |  |
| $TiO_2$ | 0.008 | 0.023 | 0.027 |  |  |
| $SO_3$ | 0.20 | 0.25 | 0.17 |  | 0.2 |
| $F_2$ |  |  |  | 3.92 |  |
| $Cr_2O_3$ |  |  |  |  | 0.13 |
| $Cr_5O_4$ |  |  |  |  | 0.05 |
| $As_2O_5$ |  |  |  |  | 0.0035 |
| Annealing point, ° F. | 973 | 972 | 975 | 995 | 981 |
| Softening point, ° F. | 1,316 | 1,296 | 1,310 | 1,427 | 1,301 |

The glasses to be treated are oxidized glasses, that is, glasses which exert an oxidizing effect on $Cu^+$ ions by oxidizing at least a portion of the $Cu^+$ ions migrating into the glass. Such glasses are made simply by melting the batch in air or another oxidizing atmosphere, or by incorporating an oxidizing agent into the starting batch. As defined in ASTM C162–52, an "oxidizing agent" is a compound which decomposes during the melting or fining of the starting batch to supply oxygen to the other batch materials. Typical oxidizing agents are the nitrates of sodium and postassium (usually incorporated into the batch with arsenic oxide) and the sulfates of sodium, calcium, or barium.

The softening point is defined as that temperature at which the specific glass has a viscosity of $10^{7.6}$ poises, and can be determined by the method of ASTM C338–57, described in ASTM Standards on Glass and Glass Products. "Methods of Testing Specifications," 5th ed., December 1962.

Composition 1 is a typical soda-lime glass, while compositions 2 and 3 are variations of the general soda-lime type. Formula 4 represents a glass of the fluoride opal type, and Formula 5 is a chrome green-colored container glass.

Example 1.—Glass rods approximately $\frac{3}{16}'' \times 4\frac{1}{2}''$, composed of composition 1, were placed in a closed stainless steel vessel or chamber of the kind designated at 1 in FIGURE 2, which in turn was located in an electric furnace 2. The chamber 1 was about $4\frac{1}{2}''$ high, $6\frac{1}{2}''$ wide and 14" long. Two tubes 3 and 4 extended through its front closure. One of these tubes, a gas inlet line 3, terminated at the front 5 of the chamber, and the second tube, an exhaust line 4 for the gas atmosphere, extended to the rear 6 of the chamber. Insulating bricks 7 were placed inside the removable front panel 8 of the treating chamber to assure a uniform temperature in the rear portion of the chamber, in which the glass rods 10 to be treated were supported about $1\frac{1}{2}''$ above the bottom of the chamber, on refractory bars 11.

Prior to heat up, a refractory crucible 12 containing powdered CuCl was set on the bottom of the chamber adjacent the rods 10. The exposed surface 13 of the CuCl in the crucible 12 was a circle about $1\frac{1}{4}''$ in diameter, and the side wall of the crucible was cut down in height so that the surface 13 of the CuCl was about $1\frac{1}{2}''$ from the crucible rim. Air having a dew point of 40° F. was introduced into the treating chamber via the inlet tube 3 at a constant flow rate of 5 standard cubic feet per hour (s.c.f.h.).

With the powdered CuCl in the furnace, the furnace was heated at its inherent heat-up rate from below 700° F. to 1100° F. over a period of about one hour. The temperature was held for $\frac{1}{2}$ hour at 1100° F. During this time the CuCl volatilized at a rate of about 0.16 gram per hour and permeated the treating chamber, some of it being swept out of the reaction chamber via tube 4. The gas molecules of the vaporized CuCl came into contact with the surface of the rods 10. A small proportion of the copper migrated from the surface into the glass network, displacing sodium ions therein. At the end of this treating period the CuCl crucible was removed from the chamber and the air flow was terminated. A refractory brick 7 was placed in the entrance 5 to the chamber, and the furnace was permitted to cool at its natural rate (over about one hour) to 800° F., at which the rods were removed.

Upon removal of the glass rods from the furnace, a white powdery film was visible on their surfaces. The film was readily removable by rinsing with water, and upon analysis was identified as common salt, sodium chloride. The glass rods were clear (uncolored) as viewed in the direction perpendicular to the treated surface; that is, the copper-enrichment of the surface imparted no significant color to it. When viewed in the direction parallel to the treated surface, a relatively bluish or bluish-green color could be ascertained, especially when compared to a similar piece of untreated glass. This coloration is believed due to the presence of oxidized copper probably in the ++ ionic state.

After cooling and rinsing the rods were tested for abraded strength. This test procedure was carried out by placing the rods in a jar containing 150 mesh silicon carbide. The jar was rotated at 86 r.p.m. on a ball mill rack for five minutes. The rods were stressed by applying load at the center of a two inch span at the rate of about 8 pounds per second until fracture occurred. The average strength in p.s.i., as calculated from the cross section of the rods so treated, was found to be 74,400 p.s.i., as compared to a strength value of 23,100 p.s.i. for the untreated abraded rods.

Example 2.—Glass rods of composition 1 were treated in the general manner specified in Example 1, but no CuCl was present in the chamber and no external atmosphere was circulated through the chamber during heat-up to 1100° F. When the temperature in the chamber reached 1100°, a CuCl-containing crucible was placed in the chamber and air having a dew point of 76° F. was circulated at a rate of 5 s.c.f.h. After a ½ hour hold at 1100° F., the reaction chamber was cooled at furnace rate to below 800° F. The CuCl crucible remained in the chamber and the air atmosphere was circulated during the cooling down period.

The rods so produced had a visible, white, easily removable salt film, were transparent and were not stained by their copper content. They had an average strength of 72,500 p.s.i. as measured by the test method described in Example 1, as compared with the 23,100 p.s.i. of untreated rods of the same composition.

Example 3.—Glass rods of composition 2, of very uniform circular cross section, were placed in the reaction chamber and treated in the manner described in Example 2, except that in this treatment the CuCl-containing crucible was removed from the chamber and the air flow terminated after the ½ hour hold at 1100° F. The strength of the abraded rods was 58,600 p.s.i., as compared to the abraded strength value of 20,000 p.s.i. for rods of the same composition which had not been subjected to the CuCl treatment.

Example 4.—Glass rods of composition 1 were treated in a manner similar to Example 1, with the exception that air having a dew point of −30° F. was circulated at a rate of 5 s.c.f.h. The rods so treated had a strength of 76,400 p.s.i.

Example 5.—Glass rods of composition 1 were subjected to the CuCl-thermal treatment described in Example 3, with the exception that in place of air, bottle nitrogen bubbled through water to give a dew point of about 76° F. was introduced into the reaction chamber at a rate of 5 s.c.f.h. The rods so treated displayed a strength of 56,400 p.s.i.

Example 6.—Rods of composition 1 were treated in the manner described in Example 2, with the exception that in place of air, dry bottle oxygen was introduced into the treating chamber at a rate of 5 s.c.f.h. These rods had a strength of 41,700 p.s.i.

Example 7.—One group of rods having the composition of Formula 1 were placed in the treating furnace about 1½" above the bottom of the chamber, while a second group of rods of the same composition was placed higher, near the top of the furnace, about 3 inches above the first group. Air having a dew point of 40° F. was introduced at a constant rate of 1 s.c.f.h. The thermal cycle was otherwise similar to that described in Example 1.

After cooling, the rods of the group which had been treated adjacent the top of the chamber displayed an abraded strength of 48,800 p.s.i., while those which had been treated lower in the chamber displayed a strength of 69,600 p.s.i., indicating that a concentration gradient of the CuCl vapor existed within the chamber, and that better strength was obtained at the higher CuCl concentration adjacent the bottom of the chamber.

In order to produce ware of more consistent strength properties, or to treat the inside of hollow ware at a rapid rate while avoiding excessive vapor deposits at localized spots on the outside surface, the distribution of CuCl vapor in the atmosphere within the chamber may be made more uniform by gentle circulation of the atmosphere throughout the chamber.

Example 8.—Glass rods of composition 1 were subjected to the treatment described in Example 1, with the exception that the air flow rate was 10 s.c.f.h. during heat-up and the ½ hour hold at 1100° F. The rods so treated displayed an abraded strength of 48,100 p.s.i.

In articles treated by the method of this invention, the copper ion-rich surface layer is in compression. This can be ascertained by viewing a thin fractured sample edgewise in polarized light between crossed nicols in a microscope, according to known techniques.

The foregoing Examples 1–8 demonstrate that the exact nature of the copper halogen-conveying atmosphere, whether air, oxygen, or nitrogen, is not critical for the improvement to be obtained. However the atmosphere should not be such as will reduce the copper ions to the metallic state. Reduction of a substantial proportion of the migrated copper causes a reddish color to form in the glass, changing the initial color of the glass.

Presence of water vapor in the atmosphere is not critical for a strength improvement to be obtained, but use of a moisture containing atmosphere seems to produce higher strengths, and I presently prefer to carry out the treatment in an atmosphere in which water vapor corresponding to a dew point of about 30° F. or higher is present.

In each of Examples 1–8 a visible white salt film formed on the exposed surface of the treated rods. This can be taken as one simple indication that the heating cycle has caused the copper to displace alkali in the glass. If the samples are exposed to a CuCl vapor which is more highly concentrated, or are exposed for a longer time, several conditions may occur. As explained, when the treatment is at the most useful CuCl level, a visible white salt deposit forms on the rods. This deposit is easily removed by rinsing or can be dissolved in a lubricity spray and left on the glass surface. As the CuCl concentration increases, the coating becomes darker but is easily removed by rinsing and generally has no adverse effect. At still more concentrated vapor levels the vapor leaves a dark coating on the article: in this case the deposit may require some mechanical force or mild abrasion as well as rinsing to be removed from the glass surface, although the deposit is not otherwise harmful. Still greater exposure to CuCl leaves a deposit which cannot be washed or rubbed from the rods and which may be undesirable commercially depending upon intended use, although nonetheless an improvement in strength over the untreated rods is obtained.

Where the treatment is such that small dark specks of CuCl become fused to the rod, these cause a local decrease in the strength of the rod at the point of fusion, and hence are ordinarily to be avoided. It is believed that these specks are sometimes caused by sputtering of the material in the crucible, and hence can often be avoided by placing a porous refractory baffle over the top of the crucible which will prevent escape of droplets from it. Another cause of specking is condensation from relatively cool overhead surfaces in the furnace.

Examples 1–8 all involved treatments at peak temperatures at which the viscosities of the glasses were about $10^{11}$ poises.

Example 9.—Glass rods of composition 2, together with a copper chloride-containing crucible were placed point of the glass. No externally admitted atmosphere was circulated through the furnace. After one hour at 800° F. the crucible was removed and the temperature of the furnace was raised to 1100° F. and held for ½ hour. The strength of the rods so treated was 38,500 p.s.i.

Example 10.—Rods of composition 2 were placed in the chamber wih a copper chloride-containing crucible at 900° F. After one hour the CuCl crucible was removed, and the temperature of the furnace was raised to 1150° F. and held there for one-quarter hour. At this temperature the rod became slightly deformed, due to inadequate support for its sectional configuration. The abraded strength of the article so treated was 28,200 p.s.i. as compared with a strength of 20,000 pounds for untreated abraded rods.

These Examples 9 and 10 illustrate that it is not necessary for the initial exposure to the cuprous halogen to be at a temperature above the annealing point of the glass, provided that the articles exposed at lower temperatures are subsequently treated above the annealing point. If the vapor phase exposure is to be used, the temperature must be sufficiently high to vaporize the halogen at useful rates. Ordinarily this is about 750° F. or higher. Halogen vapor pressures of about 0.5–2 mm. Hg are especially useful.

Example 11.—Several rods drawn from a standard commercial soda-lime glass were individually treated in a glass-ceramic vessel with the cover open about ¼". The vessel was placed directly in an electric furnace, with a CuCl-containing crucible inside the vessel. No external atmosphere was circulated.

Groups of these rods were subjected to different treating cycles, as follows:

| | Temperature, °F. | Glass Viscosity, poises | Hold Time, hour | Average Strength, p.s.i. |
|---|---|---|---|---|
| Cycle 1 | 1,000 | $10^{12.6}$ | 1 | 25,400 |
| Cycle 2 | 1,050 | $10^{11.7}$ | ½ | 53,600 |
| Cycle 3 | 1,100 | $10^{11.0}$ | ¼ | 58,700 |
| Cycle 4 | 1,100 | $10^{11.0}$ | ⅔ | 50,500 |
| Cycle 5 | 1,100 | $10^{11.0}$ | 1 | 40,600 |

In addition to improving the mechanical strength of glass objects, the treatment of the present invention has also been found to improve their thermal shock resistance. That is, articles treated in accordance with this invention are better able to withstand sudden temperature changes than the untreated article. This is illustrated by the following example.

Example 12.—Glass plugs of composition 3 were molded as cylindrical bodies 0.43" in diameter and 1.25" long. One end of the cylinder tapered into a cone 0.22" high, and 0.15" from the opposite end a circumferential rib 0.06" wide was located. These plugs, together with a crucible containing copper chloride, were treated over localized areas thereof in separate tests in a chamber of the type described in Example 1, for different time-temperature periods as tabulated below. At the termination of the high temperature treatment the chamber was opened, the samples were removed and allowed to cool in air or alternatively were quenched with an air jet.

After cooling, the samples were subjected to a sudden thermal down shock of 270° F. differential by heating them to a temperature 270° F. higher than room temperature, then quenching the treated areas with water at room temperature.

Times and temperatures for this series of tests were as follows:

| Treatment | | Air flow during treatment, s.c.f.h. | Cooling |
|---|---|---|---|
| Cycle 1 | ½ hr. at 1,075° F. | 5 | Still air. |
| Cycle 2 | ½ hr. at 1,055° F.; ¼ hr. to 1,125° F.; ½ hr. at 1,125° F. | 3 | Do. |
| Cycle 3 | ½ hr. at 1,125° F. | None | Air jet. |

In each case the heat-up to treating temperature took place in about 1 hour. Each of the plugs so treated survived a thermal downshock cycle of 270° F. at least one hundred times, whereas similar plugs thermally tempered at 1100° F. and quenched, but not treated with CuCl, invariably broken on the first 270° F. shock test.

The weight percent copper in the surface layer of flat pieces of soda lime window glass treated by the three cycles of Example 12 was measured by the X-ray fluorescence method described by Shonebarger and Carr in The Glass Industry, v. 44, No. 10, October 1963, p. 557. Copper contents imparted by these cycles were 0.325, 0.546, and 0.365% respectively. Other samples subjected to the CuCl treatment at 1025° F. for ½ hr. contained surface proportions of copper averaging 0.093%. Plugs of composition 3 treated according to the latter cycle were able to withstand the 270° F. shock test better than untreated plugs, but were not as good as the samples treated at 1055° F. and higher in Example 12. I presently believe that copper concentrations in the surface compression layer of about 0.2 to about 3% wt., as measured by X-ray fluorescence, are the more desirable.

The peak temperature at which any particular glass article can most effectively be treated depends upon the shape of the article. In general the article should not be treated at a temperature above which deformation or sagging occurs to an undesirable extent. For example, the plugs referred to in Example 12 were treated at temperatures up to 1125° F., at which the viscosity of the glass was about $10^{10.6}$ poises. While that temperature was suitable for articles of that particular shape, larger or more complex shapes of the same glass might distort excessively at that temperature. On the other hand, treatment at still higher temperatures (or lower viscosities) can be used for shapes where deformation is not a critical operating restriction, for example, during the drawing of sheet glass. Ordinarily, treatment at viscosities in the range of $10^{10.6}$ to $10^{12.6}$ poises in the more suitable, and treatment at viscosities of about $10^{11.0}$ to $10^{11.7}$ poises is particularly useful.

Example 13.—The treatment of glass plugs similar to those described in Example 12 on a continuous basis may be carried out in accordance with the following method. After molding, the plugs are supported on their peripheral ribs in an apertured plate, and the plate is placed across an open topped container in which a CuCl-containing crucible is placed beneath the plugs. The container and plugs are sent through a standard commercial annealing lehr, in which they are heated from about 700° to 1100° F. over a ½ hr. period. During this period the copper chloride in the crucible vaporizes and migrates into the exposed surface of the plugs below the plate by which they are supported, the portion of the plugs above the plate not being exposed to the vapor. Temperature in the lehr is held for ½ hr. at 1100° F., following which the box and plugs are removed. While supported on the plate the plugs are cooled rapidly with air circulated by a fan. This cooling quickly cuts off further thermal migration of copper into the glass, and may be used to slightly further strengthen the article by imparting a thermal temper to it. Plugs treated in accordance with this cycle have survived repeated thermal down-shock cycles of 400° F.

Example 14.—Rods were drawn from a glass of composition 4 and were allowed to cool in air. The average strength of these rods in the as drawn condition, without abrasion, was 51,900 p.s.i. Other rods of the same composition were exposed to CuCl vapor in a stationary air atmosphere during heating to 1140° F. and for ½ hour at 1140° F., at which their viscosity was $10^{11.2}$ poises. The rods were cooled in air at a rate similar to that inherent in the initial drawing operation. The average strength of these rods was 89,500 p.s.i. When abraded, the strength of the untreated rods drops much more rapidly than that of the treated rods, by reason of the surface layer in compression about the latter by which the abrasion is better resisted.

Example 15.—A mixture comprising 25% by weight particulate copper chloride and 75% kaolin was prepared and ground in a ball mill to fine particle size, in the presence of water sufficient to make a thin slip. Glass rods of composition 2 were dipped in this slip to coat them and were then dried with the copper chloride-kaolin deposit adhered to their surface. These rods were subjected to a thermal treatment by heating to 1100° F. in one hour in an air atmosphere, then holding for ½ hr. at 1100° F. followed by cooling in room temperature air. Upon conclusion of the treatment the particulate material adherent to the rods was removed, and the rods were abraded and found to have a tensile strength of 24,500 p.s.i. in comparison to 20,000 strength of untreated rods.

Example 16.—Green colored bottles of composition 5 were placed in an electrically heated furnace 24 x 24 x 18" in size near two uncovered crucibles containing CuCl. The furnace was heated to a peak temperature of 1170° F. at a rate of 150° F./hr. and was held at peak for ½ hour, and then cooled. A blower in the furnace was used to circulate the interior gases. After treatment, the bottles appeared to be of essentially the same green color as originally, but displayed a hydrostatic bursting pressure of more than 509 p.s.i. as against 334 p.s.i. for the untreated bottles, and many did not break at the maximum test pressure of 550 p.s.i.

Example 17.—Glass plugs as described in Example 12 were exposed to CuBr vapors in the furnace described in Example 16, and were held at a peak temperature of 1130° F. for ½ hr. and cooled in air to room temperature. The reaction product NaBr coated the surface. The plugs withstood thermal shock of 350° F. five times without failure.

Example 18.—Glass plugs as described in Example 12 were exposed to CuI vapors in the furnace described in Example 16, and were held at a peak temperature of 1130° F. for ½ hour and cooled in air to room temperature. The surface was free of white film because the reaction product NaI had volatilized at the peak-treating temperature. The plugs withstood a 350° F. thermal shock at least five times.

Example 19.—Two pieces of ordinary window glass (soda-lime) were heated to 1200° F. and immersed into molten CuCl also at 1200° F. and held for ½ hour at 1200° F. At the end of the ½ hour treating period, the samples were removed and allowed to cool in air. The adherent CuCl was removed by immersing in 10% HCl solution. The copper concentration of one specimen was found to be 6.84% by use of X-ray fluorescent analysis. The second sample was annealed. The color of this specimen was a very light blue when viewed perpendicular to its surface. The compression layer along the treated surface was found to extend to a depth of at least 150 microns as observed under optical microscope.

In general, for obtaining highest strengths it is preferable that the displacement of the alkali metal ions by the copper ions be made to occur rather quickly, for example by exposure and diffusion periods totalling about ¾ hr. or less at temperatures of more than 50° F. above the annealing point, and that the peak temperature be about as high as can be used without causing undesirable deformation.

Under the microscope, copper-ion-rich layers roughly about 30 to 500 microns in depth have been observed in samples treated by this invention. This depth is not known to be definitive, because a minimum copper concentration must be present to be visible at all. Nonetheless, the thickness of the enriched copper ion-containing layer should preferably exceed the depth of the Griffith flaws and of any abrasion scratches to which the article is subjected in ordinary use in order to prevent the compression layer from being severely cut by abrasions, which could result in a sharp reduction in the strength of the article.

I claim:

1. The method of increasing the mechanical strength, without the development of coloration therein, of articles formed from an oxidized soda-lime glass containing 45 to 80% by weight $SiO_2$ and 7 to 25% $Na_2O$, said method consisting essentially of the steps of, contacting at least a portion of the surface of the article with a material reactive therewith consisting of a cuprous halogen compound, heating the article in contact with said cuprous halogen compound to a temperature which is above the annealing point of the glass but below the temperature at which the article sags out of desired shape, said heating being continued for a period sufficient to enrich a surface layer of said article with copper ions from said cuprous halogen compound, said heating being carried out under conditions which are non-reducing for said copper ions, and cooling said article below the annealing point in a non-reducing atmosphere.

2. The method of strengthening, without the development of coloration therein, a shaped article formed from an oxidizing soda-lime glass composition including about 57 to 74% by weight $SiO_2$, 9–17% $Na_2O$, 4.5–12% (CaO+MgO), and up to 12% $Al_2O_3$, said method comprising, heating said article and while heating exposing it to vapor of a member of the class consisting of CuCl, CuBr, and CuI, said vapor being the sole essential material present which is reactive therewith, said heating reaching a peak temperature which is above the annealing point of the glass but below the temperature at which the article sags out of desired shape, said heating being continued for a period sufficient to form a copper ion-rich surface layer, said heating being carried out under conditions which are non-reducing for said copper ions, and cooling said article below the annealing point in a non-reducing atmosphere.

3. The method of claim 2 wherein said heating is carried out at temperatures at which the viscosity of said glass is in the range of about $10^{10.6}$–$10^{12.6}$ poises.

4. The method of claim 2 wherein said heating is at temperatures at least 50° F. above the annealing point of the glass for a period of 15–60 minutes.

5. The method of claim 2 wherein said heating period is sufficient to form a copper ion-enriched layer the surface of which upon cooling contains about 0.2–7% Cu as measured by the X-ray fluorescence method.

6. The method of claim 2 wherein said article is cooled by quenching in air at a rate selected to provide thermal temper.

7. The method of claim 2 wherein said heating is carried out in air which contains water vapor corresponding to a dew point of at least −30° F.

8. The method of claim 2 wherein said heating and exposing are carried out in the presence of CuCl vapor during said period.

9. The method of claim 8 wherein the exposure to said CuCl vapor is terminated before said article is cooled below the annealing point.

10. The method of increasing the mechanical strength, without the development of coloration therein, of a shaped soda-lime glass article formed from an oxidizing glass composition containing about 65–74% $SiO_2$, about 14–17% $Na_2O$, about 7–12% (CaO+MgO) and up to about 3% $Al_2O_3$, said method comprising, heating said article to a temperature at which its viscosity is in the range of about $10^{11.0}$ to $10^{11.7}$ poise but at which the article does not deform from the desired shape, holding said article in said range for a period of about 5–30 minutes while exposing it to a non-reducing atmosphere which contains CuCl vapor as the sole essential component thereof which is reactive therewith, thereby forming a copper ion-enriched surface layer in said article and a NaCl deposit on said article, while preventing contact of said article with CuCl in solid and liquid phases during said heating, cooling said article in a non-reducing atmosphere, and removing said NaCl deposit.

11. The method of claim 10 wherein the article is heated to said range in the presence of CuCl vapor and is cooled while out of exposure to said vapor.

12. The method of strengthening, without the development of coloration therein, a glass article consisting of an oxidizing soda-lime glass composition which consists essentially of the steps of, establishing in a chamber a non-reducing atmosphere carrying therein a dispersion of vapor reactive therewith which contains a cuprous halogen as the sole essential component thereof, exposing the glass article to said vapor in said chamber at a temperature at least 50° F. above the annealing point of said glass for a period sufficient to transfer copper ions to the glass to provide a copper ion-rich layer at a surface of the article and to anneal said layer, while avoiding contact of said article, during said exposing, with cuprous halogen in solid and liquid phases, and cooling the article in a non-reducing atmosphere.

References Cited

UNITED STATES PATENTS

| | | | |
|---|---|---|---|
| 2,075,446 | 3/1937 | Leibig | 65—31 XR |
| 3,012,902 | 12/1961 | Bayer | 65—30 XR |
| 3,345,190 | 10/1967 | Albinak | 65—32 XR |

S. LEON BASHORE, Primary Examiner

S. R. FRIEDMAN, Assistant Examiner

U.S. Cl. X.R.

65—60, 114; 106—52; 117—124

UNITED STATES PATENT OFFICE
CERTIFICATE OF CORRECTION

Patent No. 3,489,546　　　　　　　　Dated January 13, 1970

Inventor(s) Francis J. Shonebarger

It is certified that error appears in the above-identified patent and that said Letters Patent are hereby corrected as shown below:

Column 1, line 47, change "icidental" to --incidental--

Column 4, in the composition table, change:
　　"$Al_2O_5$" to --$Al_2O_3$--
　　"$B_2O_5$" to --$B_2O_3$--
　　"$Fe_2O_5$" to --$Fe_2O_3$--
　　"$SO_5$" to --$SO_3$--
　　"$Cr_2O_5$" to --$Cr_2O_3$--
　　"$As_2O_5$" to --$As_2O_3$--

Column 7, line 15, after "placed" insert --in a closed
　　furnace at 800°F., well below the annealing--

Column 8, line 21, change "broken" to --broke--

SIGNED AND
SEALED
AUG 25 1970

(SEAL)
Attest:

Edward M. Fletcher, Jr.
Attesting Officer

WILLIAM E. SCHUYLER, JR.
Commissioner of Patents